(12) United States Patent
Privat (10) Patent No.: US 10,171,524 B2
(45) Date of Patent: Jan. 1, 2019

(54) METHODS AND SYSTEMS FOR ESTABLISHING, HOSTING AND MANAGING A SCREEN SHARING SESSION INVOLVING A VIRTUAL ENVIRONMENT

(71) Applicant: ADOBE SYSTEMS INCORPORATED, San Jose, CA (US)

(72) Inventor: Guillaume Privat, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 213 days.

(21) Appl. No.: 14/993,168

(22) Filed: Jan. 12, 2016

(65) Prior Publication Data
US 2016/0127432 A1    May 5, 2016

Related U.S. Application Data

(63) Continuation of application No. 13/313,850, filed on Dec. 7, 2011, now Pat. No. 9,268,517.

(51) Int. Cl.
*G06F 15/16* (2006.01)
*H04L 29/06* (2006.01)
*G06F 3/14* (2006.01)

(52) U.S. Cl.
CPC .......... *H04L 65/403* (2013.01); *G06F 3/1423* (2013.01); *H04L 65/1069* (2013.01); *G09G 2354/00* (2013.01); *G09G 2370/022* (2013.01)

(58) Field of Classification Search
CPC . H04L 65/403; H04L 65/1069; G06F 3/1423; G09G 2354/00; G09G 2370/022
See application file for complete search history.

(56) References Cited

U.S. PATENT DOCUMENTS

| | | | | |
|---|---|---|---|---|
| 7,614,075 B2* | 11/2009 | McDowell | ............... | H04N 7/18 370/473 |
| 7,694,324 B2* | 4/2010 | McDowell | ............... | H04N 7/18 348/552 |
| 8,504,654 B1* | 8/2013 | Kominac | ................ | H04L 67/08 709/217 |
| 8,972,485 B1* | 3/2015 | French | .................. | G06F 9/5044 709/203 |
| 2006/0037051 A1* | 2/2006 | McDowell | ............... | H04N 7/18 725/80 |
| 2006/0075196 A1* | 4/2006 | Kobayashi | ............ | G06F 9/4416 711/147 |
| 2007/0005607 A1* | 1/2007 | Fukuta | .................. | G06F 9/4445 |

(Continued)

*Primary Examiner* — Anthony Mejia
(74) *Attorney, Agent, or Firm* — Shook, Hardy & Bacon LLP (57) ABSTRACT

Techniques for establishing a screen sharing session are described. Consistent with some embodiments, a web conferencing application executing at a mobile computing device enables a user to specify the identity of a remote computer. The identity of the remote computer is communicated to a web conferencing service, directing the server operating the web conferencing service to establish a remote desktop connection with the remote computer. Once established, the web conferencing service receives from the remote computer a stream of information representing a user interface of the remote computer, and then broadcasts the user interface to all computing devices participating in the web conferencing session, while enabling the mobile computing device to manipulate the user interface of the remote computer.

20 Claims, 6 Drawing Sheets

(56) References Cited

U.S. PATENT DOCUMENTS

| | | | | |
|---|---|---|---|---|
| 2007/0130289 A1* | 6/2007 | Defazio | G06F 21/6218 | 709/218 |
| 2008/0036695 A1* | 2/2008 | Murai | G06F 3/038 | 345/2.3 |
| 2008/0065996 A1* | 3/2008 | Noel | G06F 3/0481 | 715/753 |
| 2008/0201751 A1* | 8/2008 | Ahmed | H04N 21/4312 | 725/109 |
| 2009/0150987 A1* | 6/2009 | Kwak | G06Q 20/355 | 726/9 |
| 2009/0228801 A1* | 9/2009 | Lee | G06F 3/0481 | 715/730 |
| 2009/0292999 A1* | 11/2009 | LaBine | G06F 3/1454 | 715/740 |
| 2009/0307428 A1* | 12/2009 | Schmieder | G06F 3/1462 | 711/118 |
| 2010/0026608 A1* | 2/2010 | Adams | G06F 3/1454 | 345/2.1 |
| 2010/0042954 A1* | 2/2010 | Rosenblatt | G06F 1/1626 | 715/863 |
| 2011/0276715 A1* | 11/2011 | King | H04L 65/4092 | 709/235 |
| 2011/0283002 A1* | 11/2011 | King | H04L 29/08846 | 709/227 |
| 2011/0285659 A1* | 11/2011 | Kuwabara | G06F 3/041 | 345/173 |
| 2011/0314093 A1* | 12/2011 | Sheu | G06F 9/4445 | 709/203 |
| 2012/0005270 A1* | 1/2012 | Harding | G05B 19/4148 | 709/203 |
| 2012/0054740 A1* | 3/2012 | Chakraborty | G06F 9/45558 | 718/1 |
| 2012/0106541 A1* | 5/2012 | Su | G06F 3/1454 | 370/352 |
| 2012/0151369 A1* | 6/2012 | Kominac | H04L 67/02 | 715/740 |
| 2012/0151370 A1* | 6/2012 | Kominac | G06F 17/30905 | 715/740 |
| 2012/0151371 A1* | 6/2012 | Kominac | G06F 17/30905 | 715/740 |
| 2012/0151373 A1* | 6/2012 | Kominac | G06F 17/30905 | 715/740 |
| 2012/0173622 A1* | 7/2012 | Toledano | H04L 65/4076 | 709/204 |
| 2012/0306622 A1* | 12/2012 | Trinh | H04L 63/08 | 340/10.1 |
| 2012/0331032 A1* | 12/2012 | Balachandran | H04L 69/164 | 709/202 |
| 2012/0331300 A1* | 12/2012 | Das | H04L 69/164 | 713/176 |
| 2013/0039410 A1* | 2/2013 | Tan | H03M 13/05 | 375/240.02 |
| 2013/0136125 A1* | 5/2013 | Jain | H04L 47/38 | 370/392 |
| 2013/0290396 A1* | 10/2013 | Hohnke | G06F 9/441 | 709/201 |
| 2016/0127432 A1* | 5/2016 | Privat | G06F 3/1423 | 709/204 |

* cited by examiner

METHODS AND SYSTEMS FOR ESTABLISHING, HOSTING AND MANAGING A SCREEN SHARING SESSION INVOLVING A VIRTUAL ENVIRONMENT

CROSS-REFERENCE TO RELATED APPLICATIONS

This application is a continuation of U.S. application Ser. No. 13/313,850, filed Dec. 7, 2011, entitled "Method and Systems for Establishing, Hosting and Managing a Screen Sharing Session Involving a Virtual Environment," the benefit of priority of which is hereby claimed, and which is incorporated by reference herein in its entirety.

TECHNICAL FIELD

The present disclosure generally relates to data processing systems. More specifically, the present disclosure relates to methods, systems and computer program products for establishing, hosting, and managing a screen sharing session involving a virtual environment.

BACKGROUND

With various advances in computer and networking technologies, mobile computing devices have become smaller, more powerful, full-featured, and omnipresent. In fact, for many working professionals, mobile computing devices such as mobile handsets (e.g., smart phones) or tablet computing devices have become the device of choice for everyday computing tasks. Despite the vastly improved performance and feature sets of smart phones and tablet computing devices, reliance on these mobile computing devices as one's primary computing device still presents a variety of problems and technical challenges.

One frequently occurring problem involves using one of these mobile computing devices with a web conferencing service to demonstrate the look, feel and functionality of a software application executing on a desktop computer. For instance, various enterprise software applications are designed to reside and execute on desktop computers. Invoking a web conferencing session from the desktop computer on which the enterprise software application is residing and executing allows a web conference host to share his or her screen and thereby easily demonstrate the features and functionality of the enterprise software application to participants in the web conferencing session. However, when a person is away from the desktop computer on which the enterprise software application is residing and executing, and is using a smart phone or tablet computing device as his or her primary computing device, demonstrating how the enterprise desktop application operates via a web-based conferencing service provides a variety of challenges, some of which are described below in connection with the description of FIG. 1.

Figure 1:
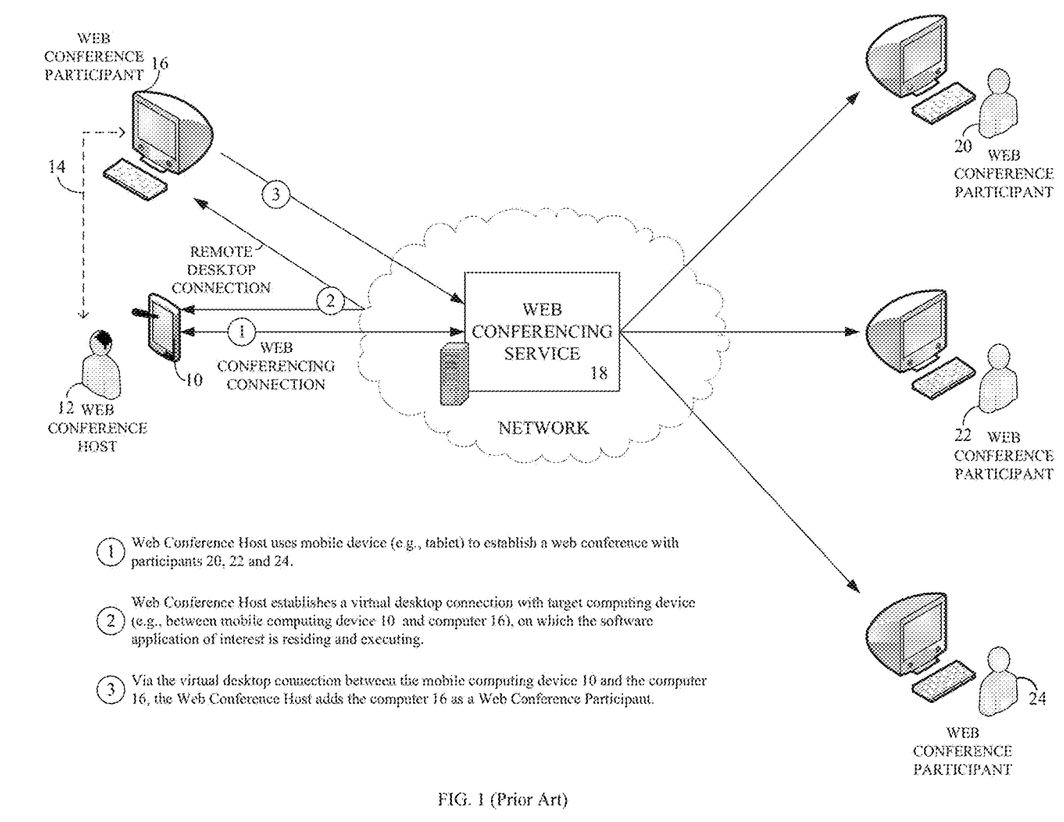
FIG. 1 is a block diagram illustrating a computer network environment in which a mobile computing device is used to establish and control separate communication sessions (e.g., web conferencing session and remote desktop session) for the purpose of performing a screen sharing operation, consistent with conventional techniques.

FIG. 1 illustrates a conventional approach to using a mobile computing device (e.g., such as a tablet computer 10) to demonstrate to participants in a web conferencing session the look, feel and functionality of a software application residing and executing on a computer 16 that is remote from the mobile computing device 10. As illustrated in FIG. 1, a first participant referred to as the web conference host 12 is shown to be operating a mobile computing device (e.g., tablet computer 10). In addition, as indicated by the dotted line with reference number 14, the web conference host 12 is authorized to use a remote desktop computer 16 on which resides an enterprise software application. In order to demonstrate to various web conference participants the look, feel and functionality of the enterprise software application executing on the desktop computer 16, the web conference host 12 first invokes a web conferencing application on the tablet computer 10. For instance, using a tablet-based web conferencing application, the host specifies the participants to be invited to the web conference, communicates invitations to the participants, and then initiates the web conferencing session with the server hosting the web conferencing service 18. Accordingly, with the web conferencing application residing on the tablet computer 10, the web conference host 12 establishes a web conferencing session with one or more remote participants 20, 22 and 24. This operation is represented in FIG. 1 by the line (with reference number 1 enclosed in a circle) connecting the tablet computer 10 to the server executing the web conferencing service 18.

Next, the web conference host 12 uses a second application residing and executing at the tablet computer 10 to establish a remote desktop connection with the remote desktop computer 16 on which the enterprise software application is residing and executing. This operation is represented in FIG. 1 by the line (with reference number 2 enclosed in a circle) connecting the tablet computer 10 with the remote desktop computer 16. The remote desktop connection enables the web conference host 12 to use the touch screen display of the tablet computer 10 to view and interact with the desktop interface of the remote desktop computer 16. Accordingly, once the remote desktop connection is established, the web conference host 12 can use the input mechanisms of the tablet computer 10 to manipulate the interfaces of various software applications residing and executing at the remote desktop computer 16, including the software application to be demonstrated.

Finally, using the remote desktop connection between the tablet computer 10 and the remote desktop computer 16, the web conference host 12 invokes a web conferencing application on the remote desktop computer 16, and causes the remote desktop computer 16 to join the web conferencing session as a participant. The line with reference number 3 enclosed in a circle represents this operation. By manipulating the settings of the web conferencing application, either at the tablet computer 10 or at the remote desktop computer 16, the web conference host 12 can select the screen of the remote desktop computer 16 to be broadcast to all participants in the web conferencing session. Consequently, when the web conference host 12 uses the remote desktop connection between the tablet computer 10 and the remote desktop computer 16 to manipulate the interface of the enterprise software application residing and executing at the remote desktop computer 16, the user interface of the enterprise software application is broadcast via the screen sharing feature of the web conferencing service 18 to all web conference participants, including remote participants 20, 22, and 24.

Although the above-described technique generally achieves the desired objective—that is, sharing or broadcasting the screen of the remote desktop computer 16 while the web conference host 12 manipulates the interface of the enterprise software application—a number of problems arise with this general approach and technique. First, the remote desktop application residing and executing at the tablet computer 10 generally does not provide an optimal interface for manipulating the user interface of the software applications residing and executing on the remote desktop computer 16. Specifically, tablet computers with touch screen displays that rely primarily on a touch interface as a means of receiving user input do not provide very good control over desktop applications that generally rely on receiving input via a pointing device (e.g., computer mouse, or track pad) and/or keyboard. Second, because the web conference host 10 must establish and manage the web conference via a first tablet-based application, and then establish and manage the remote desktop session through a second tablet-based application, the web conference host 12 is required to switch back and forth between the two applications, as necessary, to perform the required tasks. With many mobile computing devices, switching back and forth between applications, if possible at all, is a time consuming and clunky process at best. Finally, as the tablet computer 10 is required to establish separate communication sessions for both the web conferencing application and the remote desktop application, this technique for screen sharing requires that significant network bandwidth be available to the tablet computer 10. Because the tablet computer is mobile and may be located where wireless network access and bandwidth are limited, the bandwidth requirements for establishing and supporting both communication sessions may be difficult to satisfy.

DESCRIPTION OF THE DRAWINGS

Some embodiments of the invention are illustrated by way of example and not limitation in the figures of the accompanying drawings, in which.

DETAILED DESCRIPTION

The present disclosure describes methods, systems, and computer program products, which individually provide functionality for establishing, hosting, and managing a screen sharing session involving a virtual environment. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

For purposes of the present disclosure, a "web conferencing service" is any computer-based service that allows two or more participants to communicate and/or exchange information, including audio, video and graphical information, over a network. A web conferencing service allows information to be shared simultaneously, across geographically dispersed locations in real-time, or near real-time. As such, a web conferencing application allows for conducting meetings, training events, lectures or short presentations from a computer. Communications and information exchanged between the participants in a web conferencing session may be broadcast to all participants, or in some cases, communications and information may flow in only one direction (e.g., from a host-participant to all other participants), such as the case might be with a web-based seminar (frequently referred to as a webinar). The present inventive subject matter is applicable to any and all of the aforementioned web conferencing services, systems and applications.

Screen sharing, which is a particular feature made possible by web conferencing services, allows a participant in a web conferencing session to share the user interface being displayed on the display of the participant's computing device. As such, a "screen sharing session" involves broadcasting a user interface displayed at a computing device to one or more other computing devices, thereby enabling remote web conferencing participants to view the user interface being presented on the display or screen of a computing device that is remote from the web conferencing participants. As described in greater detail below, with embodiments of the present invention a screen sharing session can be invoked and controlled with a mobile computing device (e.g., a tablet computer or smart phone), where the user interface that is being shared (e.g., broadcast to the web conference participants) is the user interface of a computer that is remote from the mobile computing device and communicatively coupled to a web conferencing service via a remote desktop connection (e.g., a virtual environment).

For purposes of the present disclosure, the terms "web conference host" and "host-participant" are used synonymously to identify and distinguish the particular conference participant(s) who will generally have privileges and access to functionality that are not available to regular (i.e., non-host) participants. Specifically, consistent with at least some embodiments, a host-participant will have both the ability and the authority to provide the identity (e.g., hostname or Internet Protocol (IP) address) of a remote computer, for the purpose of requesting that the web conferencing service establish a remote desktop connection with the remote computer, thereby enabling the host-participant to view and manipulate the interface or desktop of the remote computer via the host-participant's computing device while the interface is being broadcast to all web conference participants. More generally, a host-participant will be able to organize and initiate a web conferencing session, for example, by specifying the identities of persons who are to be invited to participate in the web conferencing session. Additionally, a computer or computing device that is being used by a web conferencing host or host-participant is referred to herein as a "host-computing device," whereas a non-host participant's computer or computing device is referred to simply as a "participant-computing device." As described below, with some embodiments of the invention, the host-computing device is a mobile computing device, such as a smart phone or tablet computer. However, with some embodiments, the host-computing device may be a conventional desktop computer, laptop computer, or a computing device with any other form factor.

Consistent with various embodiments of the invention, and as described in greater detail below, a web conferencing application residing and executing on a mobile computing device (e.g., such as a smart phone, or tablet computer) provides functionality that enables a user to very easily and quickly share with participants in a web conferencing session the view of a user interface or desktop interface of a remote, network-connected computer. For example, by simply specifying, via the user interface of the web conferencing application at the mobile computing device, the identity (e.g., hostname or Internet Protocol (IP) address, or other identifying means) of a remote, network-connected computer, the user can invoke a command and direct a server executing a web conferencing service to establish a remote desktop connection with the remote computer. Once the remote desktop connection is established between the server and the remote computer, the desktop interface of the remote computer is received at the server, and then broadcast via the web conferencing service to each web conference participant's computing device, thereby allowing each participant to view the user interface or desktop interface of the remote computer. Additionally, the web conferencing service provides a control interface that allows a user of the mobile computing device to not only view the remote desktop interface, but also to interact with the remote desktop interface via the various input mechanisms of the mobile computing device on which the web conferencing application is executing.

Because the mobile computing device on which the web conferencing application is executing need only establish a single communication session with the web conferencing service, the bandwidth requirements for sharing the remote desktop interface are reduced from what is required with many conventional approaches. Moreover, the web conferencing application residing and executing at the mobile computing device can be optimized to take advantage of native input and control mechanisms to control the remote desktop interface. Specifically, with some embodiments, the web conferencing application will leverage application programming interfaces (API's) associated with the mobile computing device to allow for interaction with and control of the remote desktop interface via the mobile computing device's various input and control mechanisms, for example, to include any one or more of: touch screen displays, microphones, various location sensing devices (e.g., global positioning system (GPS)) and orientation sensors (e.g., accelerometers and gyroscopes), and others. Finally, because the web conferencing application on the mobile computing device provides the functionality to cause the server, on which the web conferencing service is executing, to establish the remote desktop connection with the remote computer, the user of the mobile computing device need not switch back and forth between separate and distinct applications for establishing the web conferencing session, and establishing the remote desktop connection. Other advantages and aspects of the inventive subject matter will be readily apparent from the description of the figures that follows.

Figure 2:
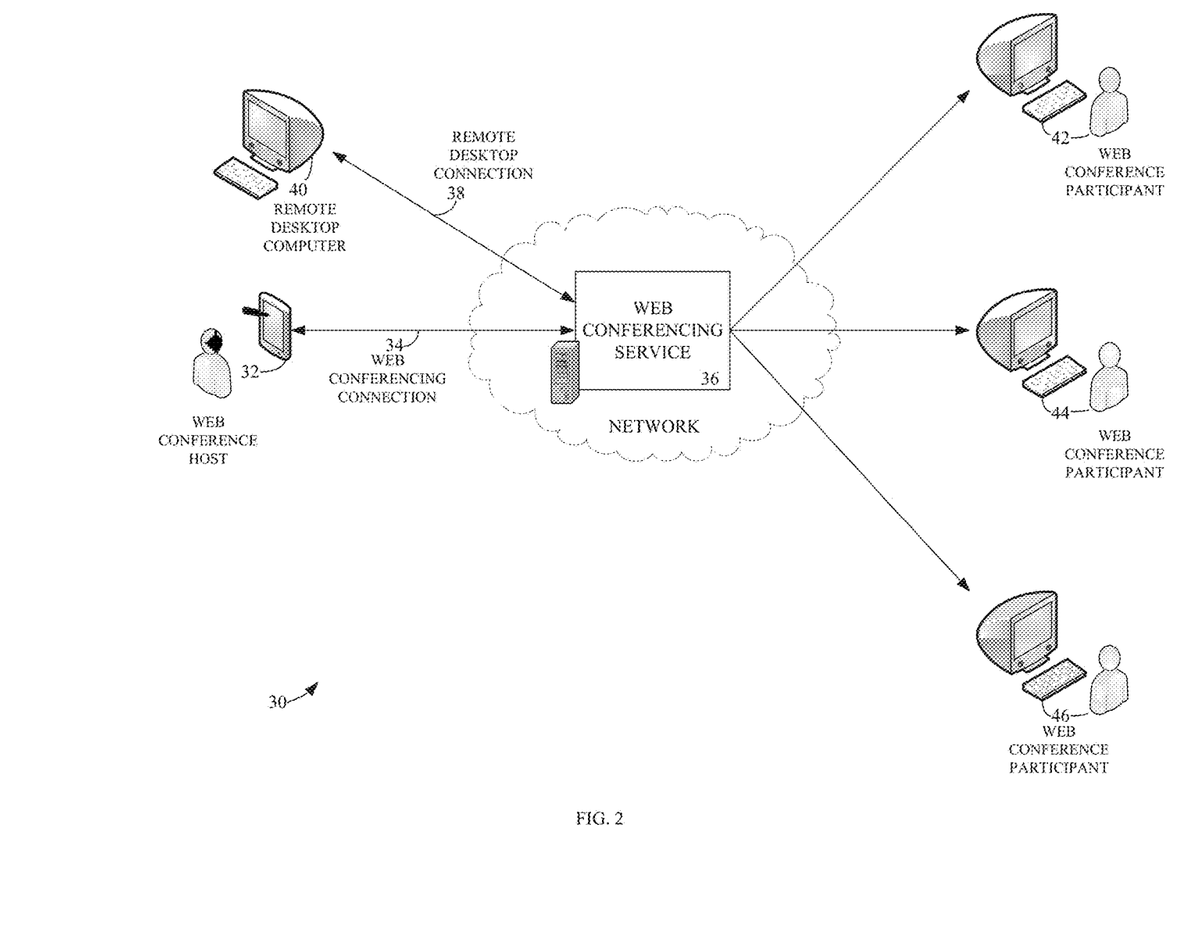
FIG. 2 is a block diagram illustrating a computer network environment in which a mobile computing device executing a web conferencing application, consistent with an embodiment of the invention, is used to establish a web conferencing session with a web conferencing service, and to direct the web conferencing service to establish a remote desktop connection with a remote computer, thereby allowing the user interface of the remote computer to be broadcast and shared with web conference participants.

FIG. 2 is a block diagram illustrating a computer network environment 30 in which a mobile computing device 32 executing a web conferencing application, consistent with an embodiment of the invention, is used to establish a web conferencing connection (or session) 34 with a web conferencing service 36, and to direct the web conferencing service 36 to establish a remote desktop connection (or session) 38 with a remote computer 40, thereby allowing the user interface of the remote computer 40 to be broadcast and shared with web conference participants 42, 44, and 46. Although the mobile computing device 32 being operated by the web conference host in the example of FIG. 1 is presented as a tablet computer, in other embodiments of the invention the client computing device of the web conference host might be any type of computer, having any number of form factors, to include desktop, laptop, and notebook computers, as well as a variety of other more application-specific devices, such as computing devices developed specifically for web/video conferencing, set top boxes and/or televisions with web/video conferencing functionality, mobile handsets or smart phones, and so forth.

For purposes of the example being presented in FIG. 2, one can presume that the web conference host using a web conferencing application executing on the mobile computing device 32 desires to demonstrate, to the web conference participants 42, 44 and 46, a software application that is residing at the remote desktop computer 40. Accordingly, the web conference host invokes a web conferencing application residing on his or her mobile computing device (e.g., the tablet computer with reference number 32). Using the web conferencing application executing on the mobile computing device 32, the web conference host initiates or invokes a web conferencing session and establishes a web conferencing connection 34 between the mobile computing device 32 and the web conferencing service 36. This may involve sending out invitations (e.g., by email or other messaging service) to the web conference participants, or alternatively, simply invoking a command to initiate the web conferencing session, if the web conferencing session parameters (e.g., list of participants, scheduled time, and any additional resources) have already been defined.

After the web conferencing session has been initiated and each web conference participant 42, 44 and 46 has established a communication session with the web conferencing service 36 with his or her respective computing device, the participants will be able to exchange information with one another. For instance, with some embodiments, the web conferencing service may facilitate audible communication via any number of communication services and/or protocols that facilitate such communications over an Internet Protocol (IP) network, such as Voice Over IP (VOIP). With some embodiments, the web conferencing service 36 may integrate with a telephony server (not shown), enabling participants to use conventional landline telephones to establish an audible connection with the other participants. Accordingly, with some embodiments, the web conferencing service 36 may allow a mix of IP-based communications, and conventional analog telephone communications.

In addition to facilitating audible communications, the web conferencing service 36 may also facilitate the exchange of graphical or video information, for example, via one or more video-based communication protocols, to include, any one of the following: Real Time Messaging Protocol (RTMP), Real Time Media Flow Protocol (RTMFP), Real-time Transport Protocol (RTP), or Hypertext Transport Protocol (HTTP). Using one of the aforementioned protocols, and a video codec, such as H.264, one of the On2 TrueMotion codecs (e.g., VP6, VP7 or VPA), the Sorenson Spark video codec (also known as Sorenson H263 or FLV1), the vlib video codec, or some other similar video codec, a data stream received at the web conferencing service from one computing device may be broadcast to the computing devices of all web conference participants. With some embodiments, using a control interface of the web conferencing application, the web conference host may choose to share a user interface being presented at the mobile computing device 32, or the user interface of a particular application executing at the mobile computing device 32. In some embodiments, more granular control may enable a web conference host to specify a particular window, or other graphical user interface element of an application, that is to be broadcast to the other participants. Additionally, at least with some embodiments, the web conference host may authorize another web conference participant to share (e.g., broadcast) information being presented on his or her display screen.

If, during the web conferencing session, the web conference host desires to demonstrate the look, feel and functionality of a software application that is residing on the remote computer 40, the web conference host can very easily establish a remote desktop connection with the remote computer 40 via the web conferencing application executing on the mobile computing device 32, and thus share the screen or user interface of the remote computer 40 with the other participants 42, 44 and 46. For instance, during the web conferencing session, the web conference host may manipulate a control interface of the web conferencing application on the mobile computing device 32, thereby enabling the web conference host to select or otherwise specify the identity (e.g., hostname or IP address) of the remote computer 40. By pressing a button or interacting with some other graphical user interface element, the web conference host causes the web conferencing application to communicate a command over the network, with the identity of the remote computer, to the web conferencing service 36. This command directs the web conferencing service 36 to use the hostname or IP address of the remote computer to establish a remote desktop connection 38 with the remote computer 40. In some instances, the web conference host may have previously specified the identity of the remote computer 40 at the time the initial parameters for the web conferencing session were established. In such instances, the web conference host may simply interact with a graphical user interface element presented on the touch screen display of the mobile computing device, or simply speak a command to the mobile computing device 32, to direct the web conferencing service 36 to use the previously provided parameters to establish the remote desktop connection 38 with the remote computer 40.

In some instances, the web conferencing service 36 may prompt the web conference host to enter or otherwise provide authorization information (e.g., username and password) for establishing the remote desktop connection with the remote computer 40. The web conference host may provide the authorization information via a user interface of the web conference application executing at the mobile computing device 32. Alternatively, in some instances, the web conference host may have previously provided the authorization information as part of the set-up and configuration process when providing the other parameters for the web conference session. If setup in advance, the parameters for the web conferencing session may be provided via any network-connected computer, to include the mobile computing device 32.

In any case, when the web conference host directs the web conferencing service 36 to establish the remote desktop connection 38, the web conferencing service 36 will communicate directly (e.g., via a network) with the remote computer 40 to establish the remote desktop connection 38. In the context of the present disclosure, a remote desktop connection is a connection established with a software application or an operating system feature that allows applications to be executed remotely (i.e., on a remote computer), while being displayed locally, on a locally operated computer. The desktop or user interface of the remote computer 40 is communicated to and received at the web conferencing service 36 via the remote desktop connection 38, converted or transcoded for broadcasting to the web conference participants, 42, 44 and 46, and then broadcast to the computing devices of the participants for display on their respective computing devices 42, 44 and 46. Various embodiments of the invention use any one of several remote connection protocols to establish the remote desktop connection between the web conferencing service 36, and the remote computer 40. Examples of these remote connection protocols include: Remote Desktop Protocol (RDP), Independent Computing Architecture (ICA), Remote FrameBuffer (RFB), or Virtual Network Computing (VNC), as well as other proprietary or non-proprietary protocols that serve the same or similar functions.

Once the remote desktop connection 38 is established, agent software (e.g., a remote connection software application) residing on the remote desktop computer 40 will communicate information representing the desktop user interface of the remote computer 40 to the web conferencing service 36, which will in turn, convert or transcode the information into a format suitable for broadcasting to the computing devices of all web conference participants. For example, the web conferencing service 36 will convert the information representing the user interface of the remote computer from a format consistent with one of the aforementioned remote connection protocols, to a format consistent with one of the aforementioned web conferencing (or, video) protocols. Once transcoded, the information stream received from the remote computer 40 is broadcast to the computing devices of the web conference participants.

In addition to simply broadcasting the information representing the user interface of the remote computer 40, the web conferencing service includes a control interface via which it can receive input from the web conferencing application executing at the mobile computing device. For example, with some embodiments, by default the web conferencing application of the web conference host will be authorized to communicate commands to the remote computer 40. Accordingly, the web conference host can use the mobile computing device 32 to manipulate the user interface of the remote computer, while the user interface of the remote computer is being broadcast to all web conference participants. In this manner the web conferencing service 36 facilitates a screen sharing session with a computer that is coupled to the web conferencing service via a remote desktop connection (a virtual environment) and can be manipulated via a remote, network-connected, mobile computing device.

Figure 3A:
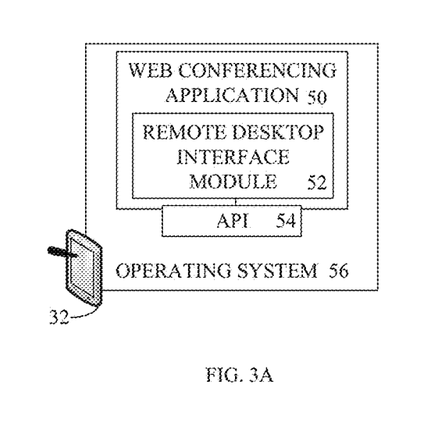
FIGS. 3A and 3B are functional block diagrams illustrating examples of a web conferencing application for execution on a mobile computing device, and a web conferencing service, respectively, consistent with embodiments of the invention.
Figure 3B:
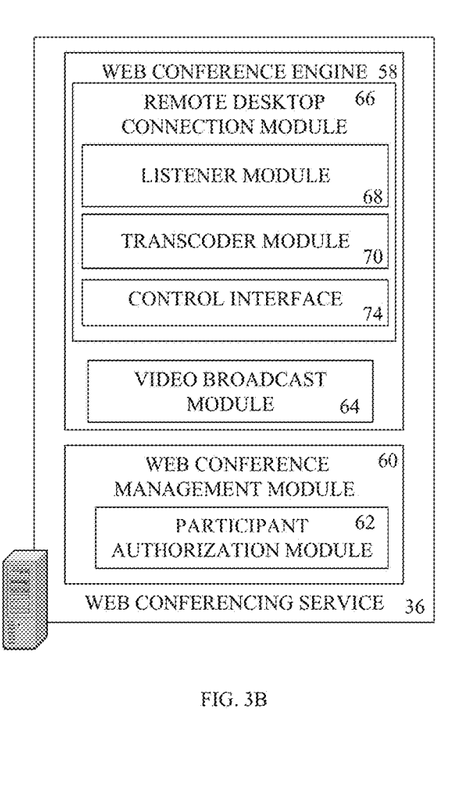

FIGS. 3A and 3B are functional block diagrams illustrating examples of a web conferencing application 50 for execution on a mobile computing device 32, and a web conferencing service 36, respectively, consistent with embodiments of the invention. As illustrated in FIG. 3A, the web conferencing application 50 resides and executes on a mobile computing device 32, and includes a remote desktop interface module 52. This remote desktop interface module 52 may leverage one or more application programming interfaces (APIs) 54 of the operating system 56 of the mobile computing device. Accordingly, the web conferencing host can interact with the remote desktop interface using various input mechanisms that are native to the mobile computing device. As such, controlling the remote desktop interface becomes much more intuitive, because the interface is customized (using the APIs) to take advantage of the native input mechanisms. For instance, with many mobile computing devices, the primary input mechanism is a multi-touch, touchscreen display. By leveraging the APIs associated with the underlying operating system of the mobile computing device, user input events detected via the mobile computing device's input mechanisms can be converted to inputs or commands suitable for processing by the application executing at the remote computer.

FIG. 3B illustrates an example of the various functional modules included in a web conferencing service, consistent with some embodiments of the invention. In particular, as illustrated in FIG. 3B, the web conferencing service consists of two primary modules, including the web conference engine 58 and the web conference management module 60. The web conference management module 60 facilitates various functions for setting up and configuring a web conferencing session. With some embodiments, the web conferencing service 36 includes a web server (not shown) by which it can receive and send information. For example, at least with some embodiments, the web conference management module 60 receives from a web conferencing application 50 information for use in setting-up or configuring a web conferencing session. The web conferencing application may be a web-based application, or may be a desktop, mobile or tablet-specific application. In any case, the information that is communicated to the web conference management module 60 to setup a web conferencing session may include the identities (e.g., names, email addresses, telephone numbers, or some other identifying information) of the persons to be invited to participate in the web conferencing session. To authorize or verify the identity of the participants prior to allowing participation in a web conferencing session, the web conference management module includes a participant authorization module 62. In addition, the information may specify a time and date when the web conferencing session is to occur. The information may also specify various parameters concerning the features and resources to be made available with the web conferencing session. For example, with some embodiments, participants may have several options for accessing audio information during the web conferencing session. With at least with some embodiments, a web conference host may identify a computer with which the web conferencing service 36 is to establish a remote desktop connection during the web conferencing session, thereby enabling the web conference host to manipulate and share the user interface of the remote computer with all web conference participants.

The web conference engine 58 includes the various modules that enable the exchange of information between participants during a web conferencing session. Specifically the web conference engine 58 includes a video broadcast module 64 for receiving information representing a user interface of a desktop software application, and then broadcasting the user interface to all participants in the web conferencing session. Accordingly, if a web conference host is using a desktop computer to participate in the web conferencing session, the web conference host can share his or her screen or display to demonstrate the look, feel and functionality of a software application executing on the web conference host's computer. Similarly, if the web conference service has established a remote desktop connection with a remote computer, the user interface of the remote computer, upon being received (e.g., by the listener module 68), and converted or transcoded (e.g., by the transcoder module 70), can be broadcast to all web conference participants by the video broadcast module 64.

In certain situations, the web conference host may be using a mobile computer (e.g., a tablet computer or smart phone), or a computer that does not have the particular software application that the web conference host would like to demonstrate to the other web conference participants. Consequently, the web conference host can specify the identity of a remote computer on which the software application resides. As illustrated in FIG. 3B, the remote desktop connection module 66, when invoked, will attempt to establish a remote desktop connection with the remote computer identified by the web conference host. The web conference host can specify the remote computer prior to, or during, a web conferencing session. Upon establishing a remote desktop connection with the remote computer identified by the web conference host, the listener module 68 of the remote desktop connection module 66 will receive a stream of information representing a user interface of the remote computer. For example, the user interface may be that of the desktop, or of a particular software application being executed at the remote computer. The transcoder module 70 transcodes, or converts, the received information from one format to another that is suitable for broadcasting or communicating to the computing devices of the web conference participants. Finally, the broadcast module 72 broadcasts the now converted information to the computing devices of the web conference participants, allowing all web conference participants to view the user interface of the remote computer.

During the broadcasting of the user interface of the remote computer, the web conference host can use the web conferencing application residing and executing on the mobile computing device to provide user-inputs that control or manipulate the user interface of the remote computer. For instance, these user-inputs generate commands that are communicated to the control interface 74 of the remote desktop connection module 66, which will in turn forward the commands to the remote computer for processing.

As described briefly above, with various embodiments of the invention, the remote desktop connection module 66 of the web conference engine 58 will use any one of several different remote connection protocols to establish the remote desktop connection between the web conferencing service 36, and the remote computer 40. While the following list is by no means exhaustive, examples of these remote connection protocols include: Remote Desktop Protocol (RDP), Independent Computing Architecture (ICA), Remote FrameBuffer (RFB), or Virtual Network Computing (VNC), as well as other proprietary or non-proprietary protocols that serve the same or similar functions. In turn, the transcoder module 70 will receive and transcode, or convert, the user interface information that is received in a format consistent with one of the above protocols into a format consistent with a video protocol. While the following list of video protocols is not exhaustive, examples include: H.264, or, one of the On2 TrueMotion codecs (e.g., VP6, VP7 or VPA). Finally, the encoded video, representing the user interface of the remote computer, is broadcast to the various computing devices of the web conference participants using any one of the following protocols: Real Time Messaging Protocol (RTMP), Real Time Media Flow Protocol (RTMFP), Real-time Transport Protocol (RTP), or Hypertext Transport Protocol (HTTP).

Figure 4:
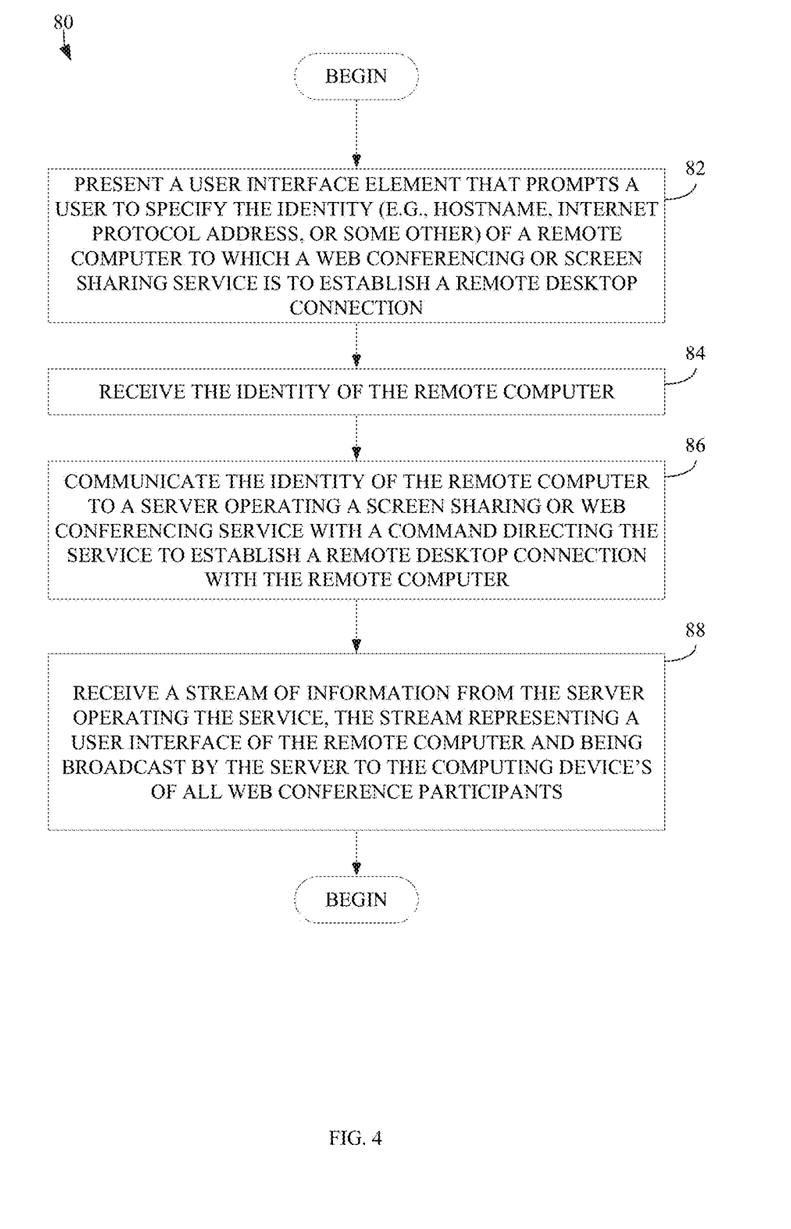
FIG. 4 is a flow diagram illustrating the method operations performed by a mobile computing device executing a web conferencing application as part of a method for establishing and managing a screen sharing session, according to some embodiments of the invention.

FIG. 4 is a flow diagram illustrating the method operations performed by a mobile computing device executing a web conferencing application as part of a method for establishing and managing a screen sharing session, according to some embodiments of the invention. Consistent with the method 80 illustrated in FIG. 4, during a web conferencing session, a web conference host manipulates a control interface of a web conferencing application. Specifically, the web conference host causes the web conferencing application, at method operation 82, to present a user interface element (e.g., such as a text entry box, or similar element), and a prompt to provide or enter the identity of a remote computer with which the web conferencing service is to establish a remote desktop connection.

Next, at method operation 84, the web conferencing application executing on the computing device of the web conference host receives the identity of the remote computer. The identity may be specified as a hostname, or an Internet Protocol (IP) address, or some other identifier that can be properly resolved to uniquely identify the remote computer with which the web conferencing service is to establish a remote desktop connection. At method operation 86, the web conferencing application communicates the identity of the remote computer to the server operating the web conferencing service. The identity of the remote computer is communicated to the server with, or as part of, a command directing the server to invoke or establish the remote desktop connection with the remote computer. Finally, at method operation 88, the web conferencing application residing and executing on the web conference host's computing device receives a stream of information from the server operating the web conferencing service. The stream of information, which is being broadcast to all web conference participants, represents the user interface of the remote computer.

Figure 5:
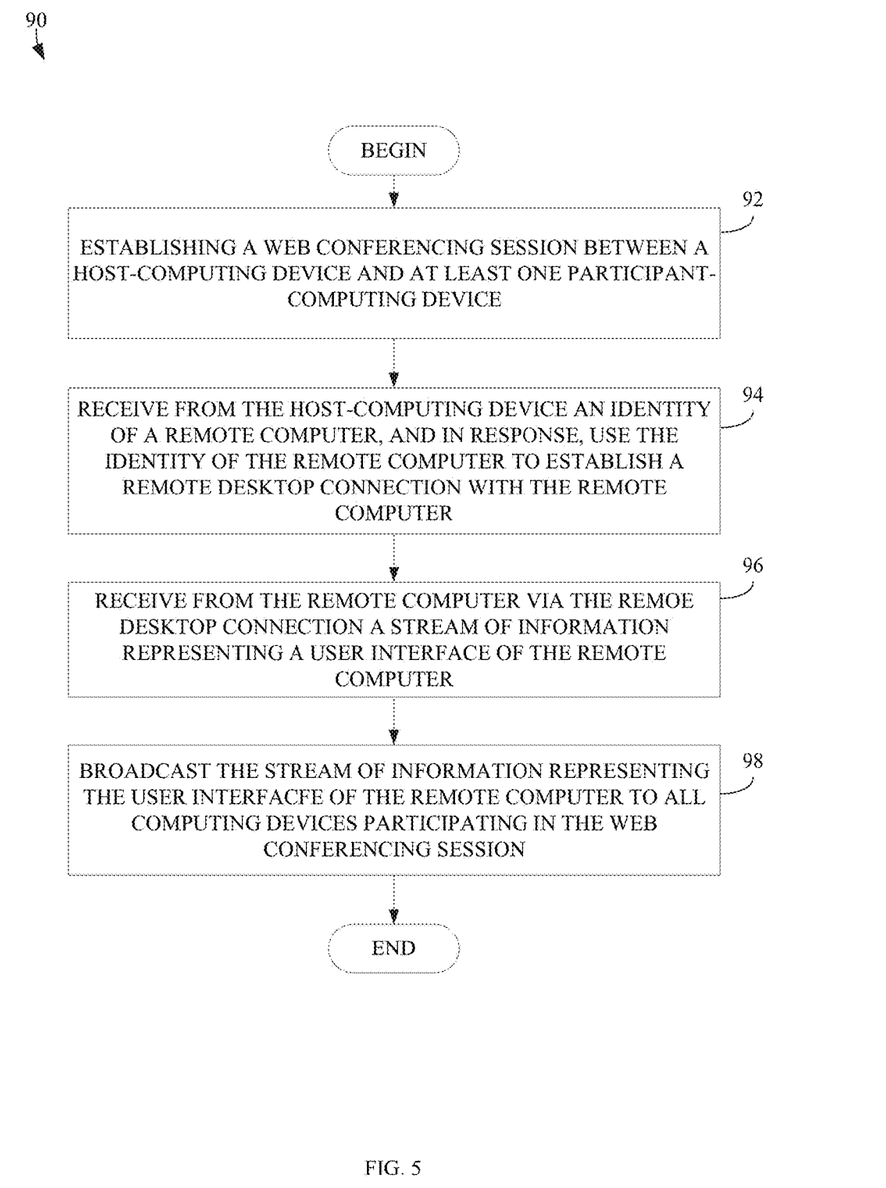
FIG. 5 is a flow diagram illustrating the method operations performed by a server operating a web conferencing service as part of a method for establishing and managing a screen sharing session using a remote desktop connection, according to some embodiments of the invention.

FIG. 5 is a flow diagram illustrating the method operations performed by a server operating a screen sharing or web conferencing service as part of a method for establishing and managing a screen sharing session using a remote desktop connection, according to some embodiments of the invention. As illustrated in FIG. 5, the method begins at operation 92 when a web conferencing session is established between a host-computing device and at least one participant-computing device. Via the web conferencing session, at least with some embodiments, the web conference participants will be able to exchange information, such as audible information. Next, at method operation 94, the server operating the web conferencing service receives from the host-computing device the identity of a remote, network-connected computer, with which the service is to establish a remote desktop connection. For instance, in response to receiving the hostname, or IP address, of the remote computer, the server operating the web conferencing service establishes a remote desktop connection with the remote computer.

At method operation 96, the server operating the web conferencing service receives from the remote computer, via the remote desktop session, a stream of information representing a user interface of the remote computer. Finally, at method operation 98 the received stream of information is converted into a format suitable for broadcasting via the web conferencing session, and then broadcast to the computing devices of the respective web conference participants.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 6:
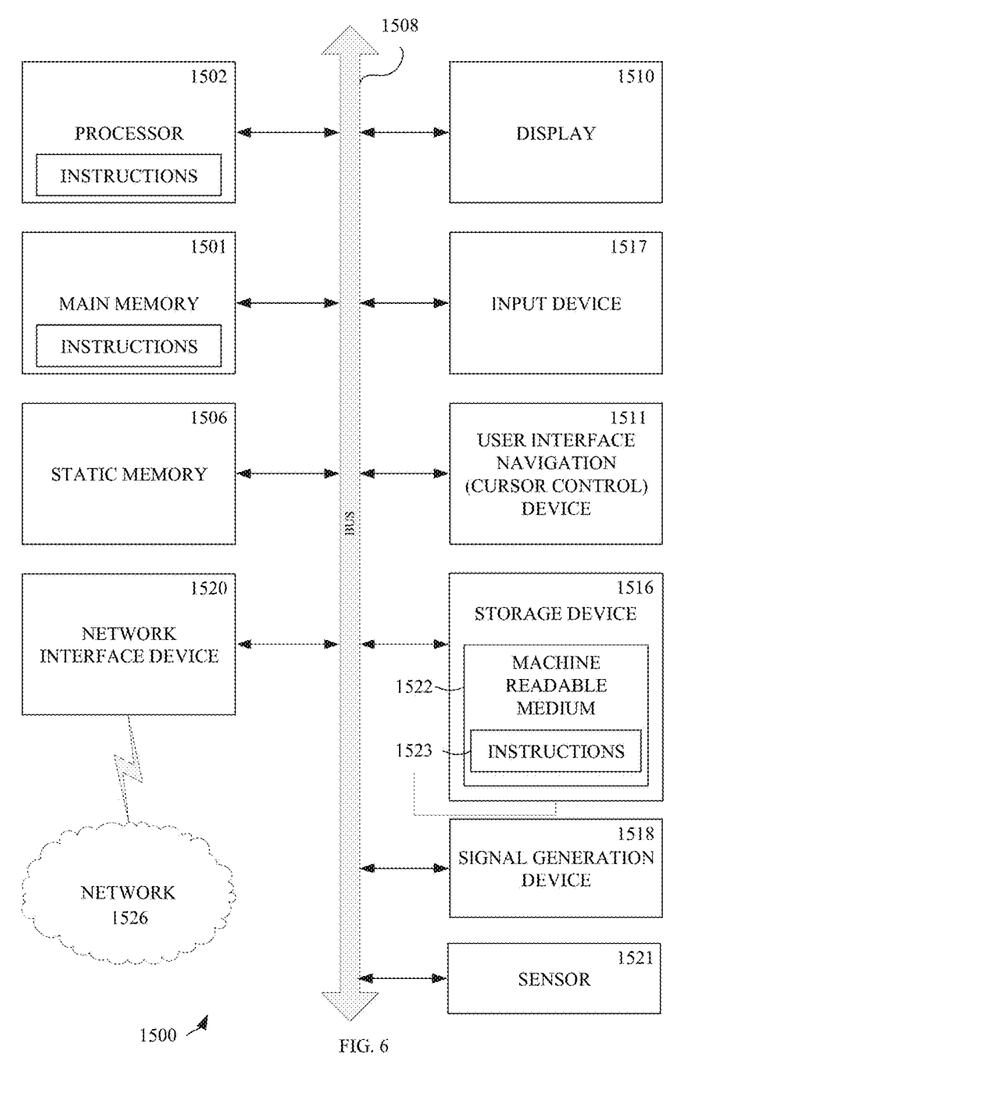
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A web conferencing system comprising:
one or more processors of a web conferencing server; and
one or more computer storage media storing computer-executable instructions that, when executed by the one or more processors, implement a method comprising:
receiving, from a web conferencing application executing at a host computing device, a request to establish a web conferencing session, the web conferencing session including the host computing device and a participant computing device,
based on the request to establish the web conferencing session, establishing the web conferencing session,
receiving, from the web conferencing application executing at the host computing device, a request to establish a remote desktop connection with a remote computing device, wherein the remote desktop connection enables the host computing device to control the remote computing device and provides for sharing a graphical user interface that is generated by the remote computing device for presentation at a display of the remote computing device, and wherein the request to establish the web conferencing session and the request to establish the remote desktop connection are received in a single communication session between the host computing device and the web conferencing server,
receiving, from the web conferencing application executing at the host computing device, an indication of an identity of the remote computing device, wherein the indication of the identity of the remote computing device is received based on a prompt for information identifying the remote computing device,
based on the request to establish the remote desktop connection with the remote computing device and on the indication of the identity of the remote computing device, establishing the remote desktop connection with the remote computing device, and
based on the remote desktop connection, sharing the graphical user interface that is generated by the remote computing device with the host computing device and the participant computing device.

2. The web conferencing system of claim 1, wherein the remote computing device comprises a desktop computer, and wherein the graphical user interface is generated based on a software application executing at the desktop computer.

3. The web conferencing system of claim 2, wherein the host computing device comprises a mobile computing device.

4. The web conferencing system of claim 3, wherein the mobile computing device comprises at least one of a mobile phone or a tablet.

5. The web conferencing system of claim 1, wherein the method further comprises:
at the web conferencing server, receiving, from the host computing device, an indication of an input intended for a software application executing at the remote computing device, and
based on the indication of the input, communicating a command to the remote computing device.

6. The web conferencing system of claim 5, wherein the software application executing at the remote computing device is controlled based on the input provided at the host computing device.

7. The web conferencing system of claim 6, wherein the input provided at the host computing device is provided via a graphical user interface associated with the web conferencing application executing at the host computing device.

8. A computer-implemented method comprising, at a server computer:
receiving a request from a host computing device to establish a web conferencing session, the web conferencing session including the host computing device and a participant computing device;

based on the request to establish the web conferencing session, establishing the web conferencing session;

receiving, from the host computing device, a request to establish a remote desktop connection with a remote computing device, the request comprising an indication of an identity of the remote computing device, wherein the indication of the identity of the remote computing device is received from the host computing device based on a prompt for information identifying the remote computing device, and wherein the request to establish the web conferencing session and the request to establish the remote desktop connection are received in a single communication session between the host computing device and the server computer;

based on the request to establish the remote desktop connection with the remote computing device and on the indication of the identity of the remote computing device, establishing the remote desktop connection with the remote computing device, wherein the remote desktop connection enables the host computing device to control the remote computing device; and based on the remote desktop connection, sharing a graphical user interface of the remote computing device with the host computing device and the participant computing device.

9. The method of claim 8, wherein sharing the graphical user interface of the remote computing device comprises communicating, from the server computer to the host computing device and the participant computing device, data corresponding to the graphical user interface that is generated by the remote computing device for presentation at a display of the remote computing device.

10. The method of claim 9, wherein the data is used by the host computing device and the participant computing device to present the graphical user interface that is generated by the remote computing device at a display of the host computing device and a display of the participant computing device, respectively.

11. The computer-implemented method of claim 8, wherein the information identifying the remote computing device comprises at least one of a hostname or an Internet Protocol (IP) address for the remote computing device.

12. The computer-implemented method of claim 8, wherein the remote computing device comprises a desktop computer, and wherein the host computing device comprises a mobile computing device.

13. The computer-implemented method of claim 8, further comprising:

at the server computer, receiving, from the host computing device, an indication of an input intended for a software application executing at the remote computing device; and based on the indication of the input, communicating a command to the remote computing device.

14. The computer-implemented method of claim 13, wherein the software application executing at the remote computing device is controlled based on the input provided at the host computing device.

15. Computer storage media having computer-executable instructions embodied thereon that, when executed by a computing device having a processor and a memory, cause the computing device to perform a method comprising:

establishing, via a web conferencing application, a web conferencing session including a host computing device and a participant computing device;

receiving, from the host computing device via the web conferencing application, a request to establish a remote desktop connection with a remote computing device, the request comprising an indication of an identity of the remote computing device, wherein the indication of the identity of the remote computing device is received from the host computing device based on a prompt for information identifying the remote computing device;

based on the request to establish the remote desktop connection with the remote computing device and on the indication of the identity of the remote computing device, establishing the remote desktop connection with the remote computing device, wherein the remote desktop connection enables the host computing device to control the remote computing device; and based on the remote desktop connection, sharing a graphical user interface of the remote computing device with the host computing device and the participant computing device.

16. The computer storage media of claim 15, wherein sharing the graphical user interface of the remote computing device comprises communicating to the host computing device and the participant computing device data corresponding to the graphical user interface that is generated by the remote computing device for presentation at a display of the remote computing device.

17. The computer storage media of claim 16, wherein the graphical user interface that is generated by the remote computing device is generated based on the remote computing device executing a software application that resides at the remote computing device.

18. The computer storage media of claim 17, wherein the software application that resides at the remote computing device is responsive to an input provided at the host computing device.

19. The computer storage media of claim 18, wherein the input provided at the host computing device is provided at a touch screen display of the host computing device and via a graphical user interface associated with the web conferencing application executing at the host computing device.

20. The computer storage media of claim 15, wherein sharing the graphical user interface of the remote computing device comprises converting information representing the graphical user interface of the remote computing device from a format consistent with a protocol associated with the remote desktop connection into a format consistent with a protocol associated with the web conferencing session.

* * * * *